July 15, 1969    R. A. GARMAN    3,455,320
FLUID FLOW REGULATOR

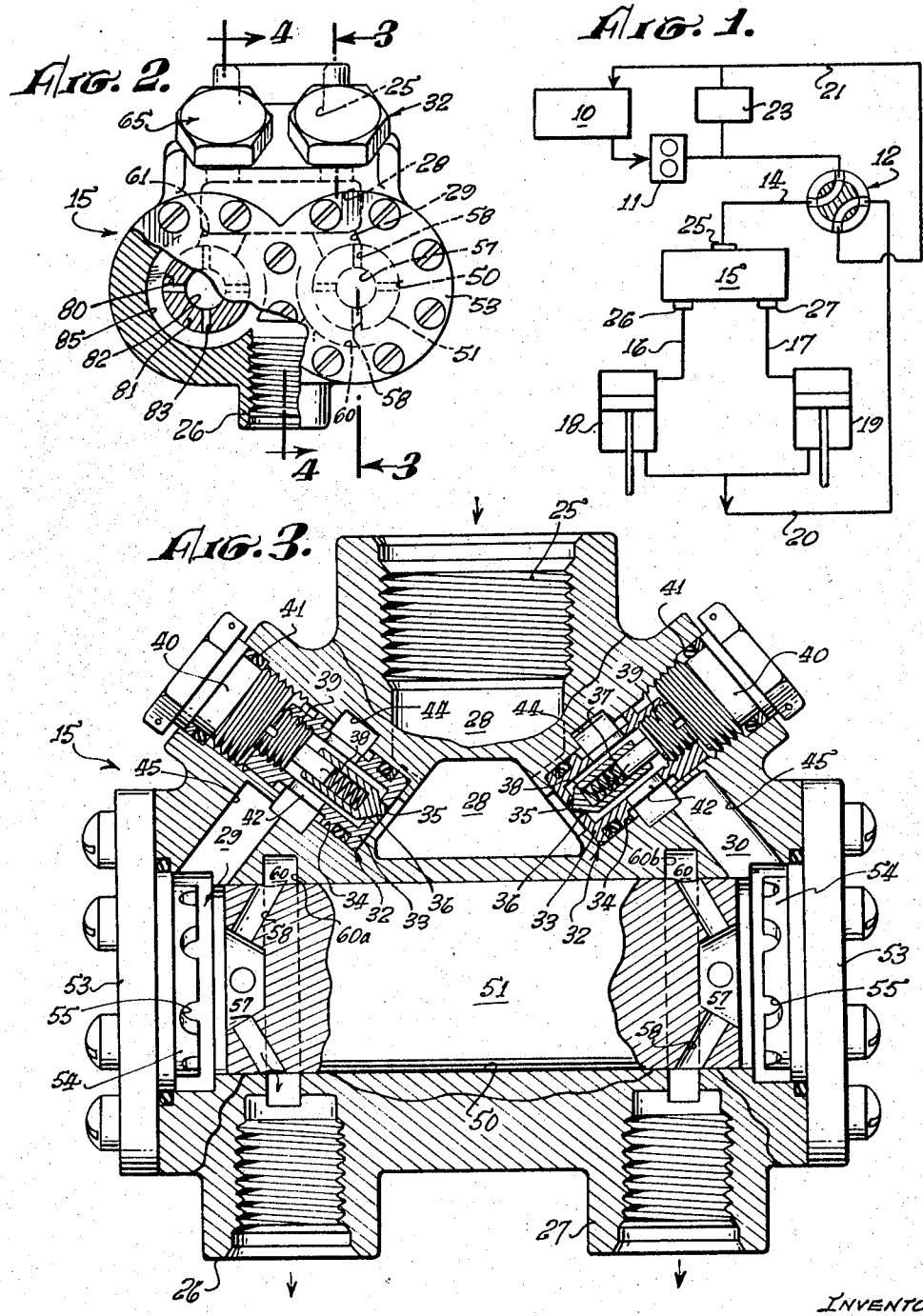

Filed June 28, 1965    2 Sheets-Sheet 2

INVENTOR.
ROBERT A. GARMAN,
By Knight & Rodgers
ATTORNEYS

United States Patent Office 3,455,320
Patented July 15, 1969

3,455,320
FLUID FLOW REGULATOR
Robert A. Garman, Stockton, Calif., assignor to Sterer Engineering and Manufacturing Company, Los Angeles, Calif., a corporation of California
Filed June 28, 1965, Ser. No. 467,593
Int. Cl. F16k 11/07; G05d 11/00
U.S. Cl. 137—101
10 Claims

ABSTRACT OF THE DISCLOSURE

A fluid flow controlling device combines into a single unit the capability of dividing flow delivered by a pump equally between two lines or two motors and the capability of combining flows from two independent sources in equal amounts into a single flow. Only a common port and two cylinder ports are required to pass the fluid to and from the unit. Separate throttle valves are provided for the two directions of fluid flow.

---

The present invention relates generally to fluid power transmission systems; and more especially to a flow regulating device in such a system for equalizing fluid flows to or from a pair of motors, thus involving a common line and branch lines between which flow is regulated by the device to equalize flows in the branch lines.

If a fluid flow regulator of this character is designed to divide a fluid flow equally into two parts from a single stream, it is known as a flow divider. If the device is designed to combine two or more flows in equal quantities into a single stream, the device is then referred to as a flow combiner. Both functions are independent of the load or force against which the flow acts or which acts on the flow in the reverse direction; and in either case the function is independent of the rate of flow. Whether used as a flow divider or a flow combiner, the general principles of the design and operation are very similar, but there are essential changes in the detailed structure between the two types of flow regulators.

There are many applications for a flow regulator or equalizer of this character. Among such applications may be mentioned that of mixing fluids or dividing a fluid flow into two or more equal parts for measuring or mixing purposes, the ratio of the flows being constant. In a fluid power transmission system, as in the case of operating a fluid motor, a typical installation involves operating two fluid motors at a fixed ratio of speeds. An example of such an application is that in aircraft where it is common practice to actuate devices from hydraulic cylinders. The operated devices may be doors, wing flaps, landing gear, or other types of devices which it is essential to move equally in order to maintain the balance in flight of the aircraft. In order to obtain equal operation of the motors, it is essential that the flow regulator divide the fluid flow from a common source into two equal flows with as much precision as possible; and of course it is likewise necessary to combine the return flows in equal proportions.

Known designs of flow regulators of this type have various disadvantages which are evident at the high unit pressures at which hydraulic control systems in aircraft are operated. These are generally operated at pressures in the range of 1,000–3,000 p.s.i. Fluid pressures above 1,000 p.s.i. are generally referred to as high pressure systems and are often characterized by flow regulation or control problems which do not arise in hydraulic systems operating at lower pressures.

Known designs of regulators of this character often suffer from an intolerable amount of vibration when operated in the high pressure range. This vibration may be caused by unstable conditions resulting from pressure surges and/or oscillation of moving parts which become significant at the high fluid pressures encountered. Thus, the high velocity fluid flow often creates extreme turbulence in the flow that in itself can cause vibration.

Vibration may occur as a result of the extreme conditions encountered at both ends of the operating cycle. As fluid flow starts, the extremely high pressure differentials encountered at a high flow rate create high pressure vibrations; and similarly at a low flow rate near the completion of the cycle, vibration often similarly occurs. Such vibration not only may destroy the effectiveness of the device to properly regulate or equalize fluid flows but can even lead to ultimate destruction of the device itself.

Consequently, it becomes a general object of the present invention to provide a novel design for a flow regulator of the character described which is substantially free from vibration over the entire range of fluid flows controlled.

It is a further object of the present invention to provide a fluid regulator of the character described which is capable of operating satisfactorily over an increased range of fluid flows, operating satisfactorily both at high and low range.

It is a further object of the present invention to provide a flow regulator of the character described having an improved port design for the flow restricting means to achieve a more satisfactory flow regulation at low range.

A still further object of the present invention is to provide a novel design for such a flow regulator that affords dimensional stability under high internal pressures, thus reducing the necessary weight of the device and reducing clearances that permit fluid leakage past flow restricting means.

These objects and advantages of the invention are contained in a preferred embodiment by providing in a single housing a flow combiner and a flow divider both of which are connected to a single common passage for fluid. The flow combiner and the flow divider each have one pair of branch passages joined to the common passage; and for this reason the flow divider portion may be also operated separately and in a physically distinct embodiment from the flow combiner portion of the device.

In each branch passage there is a first flow restricting means which exerts an effect on fluid flow in the associated branch passage. A preferred embodiment of this means comprises an orifice and a spring-loaded check valve at the orifice which operates to regulate fluid flow at low values but at high rates of fluid flow the valve is completely opened so that its restrictive effect on fluid flow is constant.

A second flow restricting means or throttling means is provided in each of the flow combiner and the flow divider, said second flow restricting means including a piston responsive to fluid pressures in both passages of one pair of branch passages at a point spaced from the first flow restricting means, the second flow restricting means being responsive over the full range of fluid flows and accordingly effecting that entire regulatory effect on fluid flow at the high end of the range of flows. In response to a deviation in pressure in one of the passages from the predetermined ratio of pressures between the two passages, the piston moves to increase or decrease fluid pressures as may be required in order to restore fluid flow and the pressures in the branch passages to the predetermined ratio.

How the above objects and advantages of the present invention, as well as others not specifically referred to herein, are attained will be better understood by reference to the following description and to the annexed drawing, in which:

FIG. 1 is a diagram of a typical hydraulic power transmission system in which a flow regulator of the present character is used.

FIG. 2 is an end elevation of a flow regulator constructed according to the present invention, a portion of the housing being broken away.

FIG. 3 is a vertical section at an enlarged scale on line 3—3 of FIG. 2 showing the fluid passages and the flow restricting means comprising the flow divider portion of the regulator.

Figure 5:
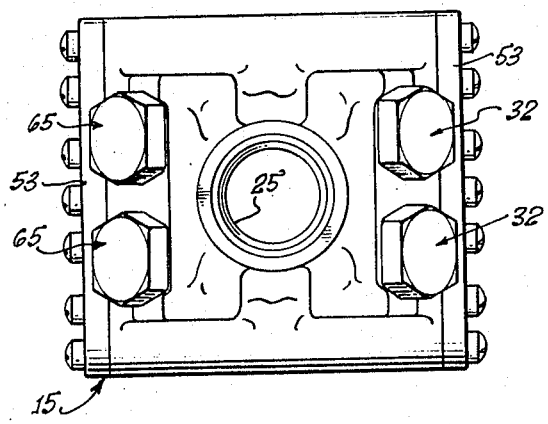
FIG. 5 is a top plan view of the flow regulator at the scale of FIG. 2.

Referring now to the drawing, and particularly to FIG. 1, there is shown therein in diagrammatic form an exemplary hydraulic power transmission system which is illustrative of, but in no way limitative upon, the system in which the flow regulator of the present invention may be employed. Fluid from a reservoir 10 is delivered by a positive displacement pump 11 to a four-way valve 12 which is connected by conduit 14 to the flow regulator 15.

Two branch conduits or lines 16 and 17 connect the flow regulator to two independent fluid motors 18 and 19, respectively. These motors are essentially hydraulic piston and cylinder arrangements which are connected to suitable loads which it is desired to move equally, such loads not being shown in the diagram.

The exhaust from the motors during the forward or downward stroke of the pistons therein is combined and conducted by conduit 20 through the four-way valve 12 to return conduit 21 which returns the fluid to reservoir 10. Systems of this character typically include a pressure responsive relief valve 23 which can open at a predetermined pressure to return fluid from the pump directly to the reservoir if operating conditions require. It will be noted that the four-way valve 12 is operable to introduce operating fluid under pressure to the underside of the pistons in motors 18 and 19 in order to drive them up, in which case fluid is exhausted through conduits 16 and 17, combined in flow equalizer 15 and is then returned to the reservoir through conduits 14 and 21.

From the arrangement of the power transmission system it will be seen that fluid flowing in what may be termed a forward direction into flow regulator 15 through conduit 14 causes the regulator to act as a fluid divider, equalizing the output flows through lines 16 and 17. When flow through the regulator is in the opposite or return direction entering from lines 16 and 17, the regulator acts as a flow combiner in order to receive fluid in equal amounts from the two input lines 16 and 17 and combine it into the output line 14.

Figure 4:
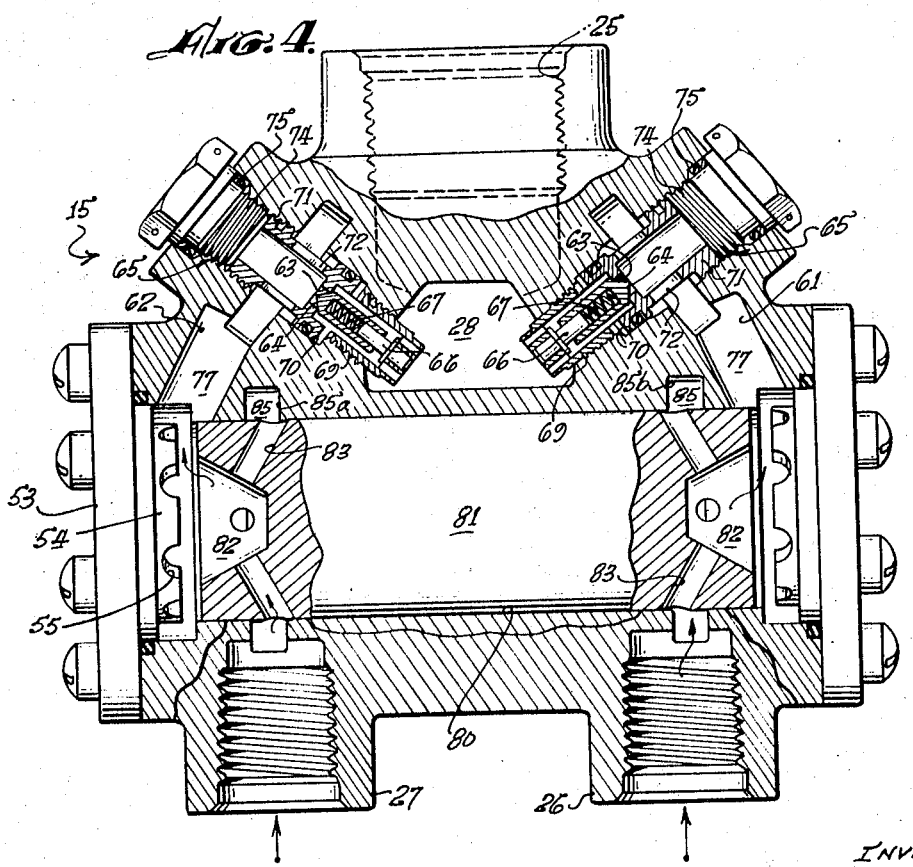
FIG. 4 is a vertical section at an enlarged scale on line 4—4 of FIG. 2 showing the fluid passageways and the flow restricting means of the flow combiner portion of the flow regulator.

The flow regulator constituting the present invention is shown in end elevation in FIG. 2 and in top plan in FIG. 5. The sectional views of FIGS. 3 and 4 show the portions which act as fluid divider and fluid combiner, respectively.

As may be seen by reference particularly to FIG. 3, the flow regulator 15 is provided with a common port 25 to which the external common conduit 14 is connected. The regulator body also has two branch line or cylinder ports 26 and 27 to which are connected respectively external fluid lines 16 and 17. Within the regulator body, port 25 is in communication with an internal common fluid passage 28 which is joined as shown in FIG. 3 to two branch fluid passages which are referred to in their entirety as 29 and 30. Branch passage 29 extends from its junction with common passage 28 to cylinder port 26 while branch passage 30 extends from its junction with common passage 28 to cylinder port 27.

Considering now the flow divider portion of the regulator, it will be seen that in each of the branch passages 29 and 30, adjacent its junction with common passage 28, there is a flow restricting means indicated generally at 32. The means in the passages are duplicates of each other so that a description of one is a description of both.

Each flow restricting means 32 includes a hollow valve insert 33 in bore 34 in the regulator body. Insert 33 is provided with a central orifice 35 through which fluid flows, in this case entering from common passage 28.

Inside insert 33 is check valve 36 which has a tapered or conical end which seats against one side of orifice 35, closing the orifice to fluid flow from the associated branch passage into the common passage 28. Check valve 36 is biased toward the closed position by spring 37 which bears at one end against the check valve and at the other against stem 38 on threaded plug 39. Stem 38 guides valve 36. This particular arrangement is preferred since by turning threaded plug 39 it is moved axially and the force of spring 37 can be adjusted to a desired value, the object being to exactly equalize the forces on the two check valves 36 which hold them closed.

Threaded plug 39 is held in any adjusted position by a second threaded locking plug 40 located at the outer end of body bore 34 and provided with suitable fluid seals, as at 41, to prevent leakage of fluid from inside the regulator.

Fluid flowing in the direction from common passage 28 into one of the branch passages, first goes through orifice 35 and then leaves the insert 33 through lateral openings 42 which open into an annular groove 44 undercut into the body and connecting with a short passage 45 which opens into one end of cylindrical bore 50. In flowing through an orifice 35, there is created in the fluid stream in the branch a pressure drop across the orifice that is proportional to the flow rate.

Cylindrical bore 50 contains, as an element of the second flow restricting means, a double-ended, free piston 51 which is shorter than bore 50 and is movable axially within bore 50 in response to any differential in fluid pressures exerted on the two end faces of the piston. This second means is commonly referred to as a throttling means. The ends of cylinder bore 50 are each closed by cover plate 53. Each cover plate 53 is preferably provided with an inwardly projecting annulus 54 having one or more recesses 55 cut in its axially facing surface, as may be seen particularly in FIG. 3. Each annulus 54 acts to limit endwise travel of piston 51 while the presence of recesses 55 insures the access of fluid from passage segment 45 to the end face of the piston, even at the extreme range of piston travel.

Each end face of piston 51 is provided with a shallow, central recess 57 from which a plurality of bores 58 extend outwardly at an acute angle to the piston axis, the outer ends of the bores terminating at the periphery of the piston at a position to communicate with a fluid collecting passage 60. Passage 60 is an annular recess undercut in the cylindrical wall of cylinder 50 and communicating at one location around its circumference with one of the two branch ports 26 and 27.

From reference to FIG. 3, it will be seen that the arrangement of the passages 58 in each end of piston 51 is the same.

Thus it will be noted that branch fluid passages 29 and 30 each include an orifice 35, a portion of the interior of insert 33 and ports 42, passage 45, the cylinder space at one end of piston 51, recess 57 and passages 58 in the piston, collection passage 60 and a portion of the passage adjacent a port 26 or 27, respectively.

When fluid enters the regulator through port 25, the fluid pressure in common passage 28 opens check valves 36, allowing fluid to flow through the first fluid restricting means comprising orifices 35. This fluid pressure moves the check valves away from the orifices against the bias of springs 37. Springs 37 are relatively light springs and high pressures existing at the initiation of forward flow through each orifice 35 insure that the check valve is open the maximum amount. The amount of this opening can be limited by contact of the check valve with plug 39 at the base of guide stem 38. Hence, under the usual inital flow conditions, the check valve reaches a maximum opening position and consequently the effective size of an orifice 35 reaches a constant maximum value. At less than fully opened positions, the check valves operate to reduce the effective size of each orifice in order to increase the actual pressure drop across the orifice at low flow rates as compared with the pressure drop at the same flow rate but without the check valve.

Fluid then flows into the spaces at the ends of piston 51 which is the second flow restricting means. Here the fluid pressure in each of the two branch passages exerts a force on one end of piston 51 directed axially of the piston and tending to shift the piston away from that branch in order to enlarge the cylinder space at the end of the piston. The piston of course remains stationary as long as the two forces thus applied are equal, but shifts away from the larger force if the forces become unbalanced for any reason until equality between the two forces is again achieved.

Variable flow restricting or throttling effect is accomplished by the change in the exposed or open area of passages 58 where they open into collection passage 60 since the outer ends of these passages are so located in the periphery of piston 51 that they may be more or less covered by the wall of cylinder bore 50. Regulation of fluid flow is achieved by movement of piston 51 in a direction to increase the total port area at the ends of a set of passages 58 opening into one collection passage 60, and thereby decrease the resistance to fluid flow offered at that location, in response to an increase in fluid pressures at the adjacent end of the cylinder, and vice versa. For this purpose, valving of fluid flow through the throttling ports is accomplished by the outer edges 60a and 60b of passages 60.

Assume pump 11 is started to deliver fluid to motors 18 and 19. Normally the pump delivers at high pressure into lines at a much lower pressure, so the flow rate is high. Under these conditions, check valves 36 open fully and the effective size of the orifices 35 is constant. The pressure drop across the orifices is proportional to flow rates.

Hence, if the flow rates in passages 29 and 30 are equal, the pressures at corresponding points in the passage are equal, as for example at the ends of piston 51. To be in equilibrium, piston 51 seeks a position such that edges 60a and 60b of the body uncover equal areas of the throttling passages 58 thereby creating equal resistance to fluid flow at these two locations in the branch passages.

Now if one motor 18 or 19 has a greater load and moves more slowly, it takes less fluid and the flow rate in the associated branch is decreased in comparison with the other branch. There is an accompanying decrease in the pressure drop at the orifice 35 so that the piston, to equalize flows, moves to increase the flow rate in the branch leading to the one motor with the greater load.

Thus, if the fluid flow rate in branch passage 30 decreases relatively to that in passage 29, it indicates a greater load on motor 19 than on motor 18. This increases the back pressure in the branch line and on the right-hand end of piston 51. Thus, piston 51 is unbalanced in a direction to move it toward the left in FIG. 3 with the result that edge 60b uncovers a larger area at the end of passages 58 to discharge fluid into collection ring 60. The decrease in restriction on flow at edge 60b as a result of this increased port area acts to lower the fluid pressure in the associated branch line and to increase the rate of flow therein to equal the flow in the other branch.

At the same time, there is a corresponding reverse action at the left-hand end of piston 51 since the movement of that piston to the left acts to decrease the port area of passages 58 uncovered by edge 60a and discharging into collection ring 60, thus increasing the amount of resistance to fluid flow at the throttling means and decrasing the rate of flow to motor 18. Thse two actions combine to equalize the pressures at the ends of piston 51 and to equalize the flow rates through the regulator to the two fluid motors 18 and 19.

Toward the end of the forward (downward) stroke of the pistons of motors 18 and 19, flow rates and pressure differentials decrease. Then check valves 36 move toward the orifices to reduce the effective size of the orifices. This means that at low flow rates insufficient to fully open the check valves, the orifices offer a greater resistance to flow, and thereby create a larger pressure drop across them than would be obtained without the check valves.

The advantage is a greater range of flow rates that can be equalized, especially at low flow rates. For example, it has been found that this design operates as satisfactorily at flows of only one-quarter gallon per minute as at ten gallons per minute, a ratio of 1:40.

Instead of being drilled radially, passages 58 are drilled at an acute angle to the longitudinal axis of the piston in order that the outer end of each passage is elliptical in shape, rather than circular. This elongation of the orifice in the direction of piston travel improves the throttling effect. This improvement results from the fact that greater piston travel is required to completely cover or uncover the elliptical shape opening than if the opening were circular. A finer or more precise flow restriction can be obtained by increasing the length of travel required of the regulatory member, in this case piston 51, for a given change of area in the orifice at which regulation occurs. Accordingly, within practical limits, regulation is improved by making the acute angle between the axis of the passage and the piston axis as small as practical. The effect can be increased by staggering axially of piston 51 the outer ends of passages 58 with respect to covering edges 60a and 60b so that at small port openings more travel of piston 51 is required for a given change in port area.

Recesses 57 are shallow and have inwardly tapered side walls to provide a surface for easily starting a drill to make each passage 58. The depth and diameter of each recess is minimized to avoid expanding the piston under maximum fluid pressures. The resultant dimensional stability of the piston 51 eliminates sticking in bore 51 when pressures are high, and also eliminates the need for clearances around the piston that are large enough to permit intolerable leakage around the piston. The construction illustrated permits aluminum to be used for both the body and the piston, greatly reducing the weight below the weight of the same unit in steel. The weight saving is important in aircraft.

The flow regulator can also operate as a flow combiner, as well as a flow divider, since it is provided with a second pair of branch passages internally. These passages of the second pair are designated respectively in FIG. 4 as 61 and 62; and the general arrangement and configuration of the parts is the same as previously described except for an essential change in the arrangement of the flow restricting means provided by the orifices and the check valves and in the passages in the piston of the second flow restricting means.

Adjacent the junction of passages 61 and 62 with common internal passage 28, each of the branch passages 61 and 62 is provided with a first flow restricting means in the form of a flow restricting orifice 63 with an associated check valve 64. Each of these flow restricting means is indicated generally at 65 in FIG. 4, in which it will be seen that the check valves close the orifices to flow in the direction from the common passage into each of the branch passages 61 and 62; but open in response to fluid pressure in the branch passages to allow flow therefrom into common passage 28.

The construction of the check valves is shown in FIG. 4 in which it will be seen that the valve member 64 is slidably mounted on and guided by a stem 66 and is biased by spring 67 to a seated position closing orifice 63. Valve stem 66 is mounted on a stationary hollow insert 69 located in bore 70 in the regulator body.

Orifice 63 is located in a hollow plug 71 having lateral openings 72 through which fluid can reach the orifice from outside plug 71. Plug 71 is threaded to screw into bore 70 and is thereby axially adjustable upon rotation to move toward and away from check valve 64. This axial movement is utilized to adjust the force exerted by spring 67 upon the check valve in order to equalize the biasing forces on the two check valves in passages 61 and 62, in the manner mentioned above. Any adjusted position of plug 71 is maintained by screwing tightly against it threaded plug 74 which is provided with suitable fluid seal means 75 to prevent leakage of fluid under pressure.

Fluid in the branch passage enters ports 72 through passage 77 constituting a segment of each of the branch passages and communicating at one end with the cylinder space at the end of bore 80 within which is axially movable, free piston 81. Piston 81 being shorter than bore 80 leaves a cylinder space at each end of the piston. Each end of bore 80 is closed by a cover plate 53 and, as mentioned before, the cover plate is provided with travel limiting means 54.

Each piston 81 is provided at each end with a recess 82 from which a plurality of bores 83 extend to the periphery of the piston. These bores 83, like bores 58, are preferably not radial but at an acute angle with the longitudinal axis of piston 81, for the same reasons assigned above. The outer ends of bores 83 are located to open into distributor passage 85 which is an annular recess undercut into the cylinder wall of the regulator body to distribute fluid to all of the passages 85 from one of the branch line or cylinder ports 26 or 27. As shown particularly in FIG. 4, the ports 26 and 27 each intersect one distributor ring 85 as well as one collector ring 60 in order to deliver or receive fluid from the branch fluid passages inside the regulator body.

There is one structural difference between piston 51 and piston 81 which is brought about by their reversal in function. It will be noticed that the passages 83 open to the periphery of piston 81 at such a point that the open outer ends of the passages valve against the inner edges 85a and 85b of collector passage 85 instead of the outer edges, as with passage 60 in FIG. 3. This brings about a change in the operation of piston 81 as a flow regulating means.

Thus, when the valve is operating as a fluid combiner, a decreased rate of fluid flow through branch passage 61 means a lesser load on fluid motor 18 and therefore a decrease in pressure in the fluid passing through the regulator in that branch. To counteract this, it is desired to reduce the flow restriction and the corresponding pressure drop imposed by piston 81. Accordingly, the decrease in fluid pressure in the cylinder space at the right hand end of piston 81 allows piston 81 to shift to the right with the result that a larger total port area at the outer ends of passages 83 is uncovered at edge 85b for admission of fluid into passages 83 from collector passage 85 and the pressure in the cylinder space at the right-hand end of piston 83 is built up.

This shift of the piston is of course accompanied by a corresponding movement at he left end by which the passages 83 at the left-hand end of the piston are moved in a direction to reduce at edge 85a the open port area of these passages which receives liquid from the associated distributor passage 85, thereby increasing the pressure drop at entry to passages 83 and reducing the pressure against the piston from liquid in the cylinder space at the left-hand end of the piston. These two changes in pressures at the ends of the piston go on simultaneously and permit the piston to shift axially to bring fluid pressures into balance again. When in balance, the forces on the two ends of the piston are equal and the piston assumes a stationary position.

All of the check-valve controlled orifices are designed to operate as fluid restricting means only at relatively low flow rates. For this reason, the springs biasing the check valves to a closed position are relatively light and allow the check valves to open to a maximum opening position under relatively low pressures. For example, if the system is designed to operate under a maximum of 3,000 p.s.i., the check valves may reach a fully open position at a pressure, for example in the range of 40–60 p.s.i., which is materially less than the pressure existing at maximum flow rate and is preferably only a minor fraction of the maximum designed pressure in the system.

Thus, at flow rates at the upper and intermediate portion of the normal range of flows, the orifices have a constant effective size. It will be noted that the restriction on flow imposed at the passages 58 or 83 in the movable pistons is variable throughout the entire range of flow rates.

The same effect is true in the case of the fluid combiner portion of the regulator. Here the flow rates while approaching completion of the return (upward) stroke drop to low values. Under these conditions, the improved flow regulation is effected by orifices 63 and check valve 64 cooperating to decrease the effective size of the orifices and thus increase the pressure drop across the orifices. This gives more power to actuate piston 81.

An advantage of the orifice and check valve construction is that they are self-cleaning. There are no sliding surfaces at which dirt or gum can lodge and impose any drag on the check valves with the result that they become unequal in effect or slow to react.

By having two flow restricting or regulating means in series with each other, such means being so designed as to dominate at opposite ends of the range of fluid flows, flow regulation is more effective at the extremes of fluid throughout. The result in operation is greater stability of fluid flows, a marked reduction in any tendency to set up turbulent flows or vibration of the pistons or check valves, thus resulting in more effective flow regulation and greater life of the unit.

In the discussion above, it is assumed that equal flows in the two branch lines are desired. However, the device can maintain any predetermined ratio of flows by proper sizing of orifices 35 and 63; and the invention is not necessarily limited to a 1:1 ratio as mentioned for illustrative purposes.

From the foregoing description of the invention, it will be appreciated that various changes in the detailed construction and arrangement of the component parts of the flow regulator may occur to persons skilled in the art without departing from the spirit and scope of the present invention. Accordingly, it is to be understood that the above description is considered as being illustrative of, rather than limitative upon, the invention disclosed herein.

I claim:

1. Flow control apparatus for equalizing fluid flow in a pair of branch passages comprising:
   a body having fluid passage means extending through the body between a common port and a pair of cylinder ports, said passage means including a first pair of branch passages and a second pair of branch passages all communicating with the common port, the branch passages of each of said pair also being in communication with the respective cylinder ports;
   a first flow restricting means in each branch passage, comprising in each branch passage an orifice of constant size and a check valve biased toward the orifice to seat at the orifice to close the orifice to fluid flow in one direction and movable away from the orifice in response to fluid pressure to permit fluid flow in the opposite direction;
   a second flow restricting means exposed to fluid pressure in both passages of the first pair of branch passages spaced downstream from said first flow restricting means in the first pair of passages;
   a third flow restricting means exposed to fluid pressure in both passages of the second pair of branch passages spaced upstream from said first flow restricting means in second pair of passages;

said second and third restricting means being responsive to a departure of fluid pressures in the respective pairs of said branches from a given ratio at said second and third means;

said response of the second restricting means decreasing the flow restriction in one branch of the first pair of branch passages and correspondingly increasing the flow restriction in the other branch of the first pair of branch passages when fluid pressure increases in said one branch and fluid flow is from the common port into said first pair of branches;

and said response of the third restricting means increasing the flow restriction in one branch of the second pair of branch passages and correspondingly decreasing the flow restriction of the other of the second pair of branch passages when fluid pressure increases in said one branch of the second pair and fluid flow is from the two cylinder ports and the second pair of branches into said common port, whereby the ratio of fluid flow in the passages of either pair of branch passages is maintained substantially constant.

2. The flow control apparatus as in claim 1 in which the check valve cooperates with the associated orifice in each branch passage to exert a variable flow restricting effect in the associated branch at low flow rates less than a predetermined rate which is a minor fraction of the maximum flow rate through said passages and the check valve exerts substantially no flow restricting effect for flow rates greater than said predetermined rate;

and said second and third flow restricting means each exert a variable flow restricting effect over the full range of flow rates through said passages.

3. The flow control apparatus as in claim 1 which includes means for individually adjusting the bias on each of the check valves.

4. Flow control apparatus for equalizing fluid flow in a pair of branch passages comprising:
  a body having fluid passage means extending through the body between a common port and a pair of cylinder ports, said passage means including a first pair of branch passages and a second pair of branch passages all communicating with the common port, the branch passages of each said pair also being in communication with the respective cylinder ports;
  a first flow restricting means in each branch passage limiting fluid flow to one direction and exerting a regulating effect on fluid flow in said direction in the associated branch passage;
  a second flow restricting means exposed to fluid pressure in both passages of the first pair of branch passages spaced downstream from said first flow restricting means in the first pair of passages;
  a third flow restricting means exposed to fluid pressure in both passages of the second pair of branch passages spaced upstream from said first flow restricting means in the second pair of passages, said second and third restricting means being responsive to a departure of fluid pressures in the respective pairs of said branches from a given ratio at said second and third means, said response of the second restricting means decreasing the flow restriction in one branch of the first pair of branch passages and correspondingly increasing the flow restriction in the other branch of the first pair of branch passages when fluid pressure increases in said one branch and fluid flow is from the common port into said first pair of branches, and said response of the third restricting means increasing the flow restriction in one branch of the second pair of branch passages and correspondingly decreasing the flow restriction of the other of the second pair of branch passages when fluid pressure increases in said one branch of the second pair and fluid flow is from the two cylinder ports and the second pair of branches into said common port, whereby the ratio of fluid flow in the passages of either pair of branch passages is maintained substantially constant;
  the second and third flow restricting means each comprising,
    a piston axially movable in a cylindrical bore in said body, said piston having at each end a plurality of passages leading from the adjacent end surfaces of the piston to the peripheral surface of the piston;
    and an annular groove cut into the wall of said bore near each end thereof communicating with a cylinder port and a branch passage and located at a position such that a variable portion of the ends of said passages in the piston is uncovered by the bore wall and exposed to the annular groove as the piston moves axially within the bore.

5. Flow control apparatus as in claim 4 in which the passages in each piston are disposed at an acute angle to the axis of the piston.

6. Flow control apparatus for equalizing fluid flow in a pair of branch lines comprising:
  a body having fluid passage means extending through the body between a common port and a pair of cylinder ports, said passage means including a pair of branch passages both communicating with the common port and each communicating with one cylinder port;
  a first flow restricting means in each branch passage exerting a regulating effect on fluid flow in the associated branch passage;
  and a second flow restricting means exposed to fluid pressures in both branch passages spaced downstream from said first flow restricting means;
    said second means being responsive to a departure of fluid pressures in said branches from a given ratio at said second means for decreasing the flow restriction in one of said branches and correspondingly increasing the flow restriction in the other of said branches in response to an increase in the fluid pressure in said one branch relative to the other branch when fluid flow is from the common port to the cylinder ports whereby the ratio of fluid flow in said branch passages is maintained substantially constant;
    said second flow restricting means comprising a piston axially movable in a cylindrical bore in said body, said piston having at each end a plurality of passages leading from the adjacent end surface of the piston to the peripheral surface of the piston;
    and an annular groove cut into the wall of said bore near each end thereof communicating with a cylinder port and a branch passage and located at a position such that a variable portion of the ends of said passages in the piston is uncovered by the bore wall and exposed to the annular groove as the piston moves axially within the bore.

7. Flow control apparatus as in claim 6 in which the passages in the piston are disposed at an acute angle to the axis of the piston.

8. Flow control apparatus for equalizing fluid flow in a pair of branch lines comprising:
  a body having fluid passage means extending through the body between a common port and a pair of cylinder ports, said passage means including a pair of branch passages both communicating with the common port and each communicating with one cylinder port;
  a first flow restricting means in each branch passage comprising in each branch passage an orifice of constant size and a check valve movable toward and away from the orifice and biased to seat at the orifice to close the orifice to fluid flow in one direction and movable in response to fluid pressure to permit fluid flow in the other direction;

and a second flow restricting means exposed to fluid pressures in both branch passages spaced upstream from said first flow restricting means, said second means being responsive to a departure of fluid pressures in said branches from a given ratio at said second means for increasing the flow restriction in one of said branches and correspondingly decreasing the flow restriction in the other of said branches in response to an increase in the fluid pressure in said one branch relative to the other branch when fluid flow is from the cylinder ports to the common port whereby the ratio of fluid flow in the branch passages is maintained substantially constant.

9. Flow control apparatus for equalizing fluid flow in a pair of branch lines comprising:

a body having fluid passage means extending through the body between a common port and a pair of cylinder ports, said passage means including a pair of branch passages both communicating with the common port and each communicating with one cylinder port;

a first flow restricting means in each branch passage limiting fluid flow to one direction and exerting a regulating effect on fluid flow in said direction in each branch;

and a second flow restricting means exposed to fluid pressures in both branch passages spaced upstream from said first flow restricting means;

said second means being responsive to a departure of fluid pressures in said branches from a given ratio at said second means for increasing the flow restriction in one of said branches and correspondingly decreasing the flow restriction in the other of said branches in response to an increase in the fluid pressure in said one branch relative to the other branch whereby the ratio of fluid flow in the branch passages is maintined substantially constant;

said second flow restricting means comprising a piston axially movable in a cylindrical bore in said body, said piston having at each end a plurality of passages leading from the adjacent end surface of the piston to the peripheral surface of the piston;

and an annular groove cut into the wall of said bore near each end thereof communicating with a cylinder port and a branch passage and located at a position such that a variable portion of the ends of said passages in the piston is uncovered by the bore wall and exposed to the annular groove as the piston moves axially within the bore.

10. Flow control apparatus as in claim 9 in which the passages in the piston are disposed at an acute angle to the axis of the piston.

References Cited
UNITED STATES PATENTS

| | | | |
|---|---|---|---|
| 2,365,095 | 12/1944 | Miller et al. | 137—101 |
| 2,460,774 | 2/1949 | Trautman | 137—101 |
| 2,483,312 | 9/1949 | Clay | 137—99 |
| 2,593,185 | 4/1952 | Renick | 137—101 |
| 2,953,150 | 9/1960 | Davis | 137—99 |

FOREIGN PATENTS 137,439   9/1952   Sweden.

WILLIAM F. O'DEA, Primary Examiner

DAVID J. ZOBKIW, Assistant Examiner

U.S. Cl. X.R.

91—411; 137—111, 118